US010222813B2

(12) United States Patent
Carns (10) Patent No.: US 10,222,813 B2
(45) Date of Patent: Mar. 5, 2019

(54) WAX ELEMENT WITH LINEAR GEAR ACTUATED FOUR-WAY VALVE

(71) Applicant: ILLINOIS TOOL WORKS INC., Glenview, IL (US)

(72) Inventor: Christopher A. Carns, Hicksville, OH (US)

(73) Assignee: Illinois Tool Works Inc., Glenview, IL (US)

(*) Notice: Subject to any disclaimer, the term of this patent is extended or adjusted under 35 U.S.C. 154(b) by 276 days.

(21) Appl. No.: 14/424,066

(22) PCT Filed: Sep. 5, 2013

(86) PCT No.: PCT/US2013/058207
§ 371 (c)(1),
(2) Date: Feb. 26, 2015

(87) PCT Pub. No.: WO2014/039639
PCT Pub. Date: Mar. 13, 2014

(65) Prior Publication Data
US 2015/0241884 A1     Aug. 27, 2015

Related U.S. Application Data

(60) Provisional application No. 61/697,154, filed on Sep. 5, 2012.

(51) Int. Cl.
*F16K 31/00* (2006.01)
*G05D 23/02* (2006.01)
(Continued)

(52) U.S. Cl.
CPC ......... *G05D 23/023* (2013.01); *F16K 31/002* (2013.01); *F16K 31/535* (2013.01); *F16K 31/54* (2013.01); *G05D 23/1333* (2013.01)

(58) Field of Classification Search
CPC ........ F16K 11/161; F16K 11/14; F16K 11/16; F16K 11/056; F16K 31/54; F16K 31/002; F01P 7/16; F01P 7/165; G05D 23/022; G05D 23/024; G05D 23/025; G05D 23/1852; G05D 23/1333; Y10T 137/7927; Y10T 137/87724; F01M 5/007
(Continued)

(56) References Cited

U.S. PATENT DOCUMENTS 3,370,612 A     2/1968 Holl
3,386,065 A *   5/1968 Algino .................. H01H 37/36
                                                    236/100

(Continued)

FOREIGN PATENT DOCUMENTS

JP          61252987 A     11/1986

OTHER PUBLICATIONS

4-Way Ball Valve, Inline Industries, 2010.*
ISR and WO for PCT/US2013/058207 dated Dec. 19, 2013.

*Primary Examiner* — Christopher R Zerphey
*Assistant Examiner* — Schyler S Sanks
(74) *Attorney, Agent, or Firm* — Joseph M. Butscher; The Small Patent Law Group, LLC (57) ABSTRACT

A four-way ball valve includes a linear gear for operating the ball element in the valve and a temperature responsive wax element connected to the linear gear for moving the linear gear and rotating the ball in response to temperature change.

15 Claims, 5 Drawing Sheets

(51) Int. Cl.
*F16K 31/53* (2006.01)
*G05D 23/13* (2006.01)
*F16K 31/54* (2006.01)

(58) Field of Classification Search
USPC .................................................. 236/99 K
See application file for complete search history.

(56) References Cited

U.S. PATENT DOCUMENTS

| | | | |
|---|---|---|---|
| 5,427,132 A * | 6/1995 | Fenner, Jr. ......... | G05D 16/0669 |
| | | | 137/79 |
| 6,336,510 B1 * | 1/2002 | Gadini .................... | A62C 37/21 |
| | | | 137/79 |
| 2004/0031523 A1 * | 2/2004 | Zeng ....................... | F16K 17/32 |
| | | | 137/460 |
| 2009/0114169 A1 | 5/2009 | Heldberg et al. | |
| 2010/0126598 A1 * | 5/2010 | Peric ........................ | F01P 7/14 |
| | | | 137/468 |
| 2011/0067394 A1 | 3/2011 | Douglass et al. | |

* cited by examiner

WAX ELEMENT WITH LINEAR GEAR ACTUATED FOUR-WAY VALVE

CROSS-REFERENCE TO RELATED APPLICATIONS

The present application is a National Phase of International Application Number PCT/US2013/058207 filed Sep. 5, 2013 and claims the benefit of U.S. Provisional Application Ser. No. 61/697,154 filed Sep. 5, 2012.

FIELD OF THE INVENTION

The present invention relates to ball valves, to four-way valves and to temperature responsive valves, and, more particularly, to a four-way thermostatic valve used in automobile cooling systems.

BACKGROUND OF THE INVENTION

Four-way valves are known for various uses and purposes in a variety of fluid circuits, to change fluid flow paths in the fluid circuit. Temperature responsive valves are also known to open, close or change fluid flow paths in fluid circuits in response to changes in temperature affecting the fluid circuit. Vacuum actuators are known for use with plastic yokes to operate the valves. It also is known to use temperature-responsive wax elements as the driving valve actuator in temperature responsive valves, wherein a wax body expands or contracts in response to temperature changes to operate the valve element. The wax elements operate the valve with springs and plastic yokes that allow for rotation of the valve elements. Known actuation methods have lacked the precision of control sometimes desirable for such valves and have not been versatile. Designing valves for different requirements has required substantial design changes. Further, known designs have been bulky and relatively complex, with numerous moving parts.

The four-way valve with a wax element and linear gear actuator described herein utilizes a temperature responsive wax element as the driving force but further includes a linear gear for more precise control of the valve in a compact package with few moving parts. Further, the design is readily adaptable to system requirement changes.

SUMMARY OF THE INVENTION

The thermostatic valve described herein has operation of a ball valve driven directly by linear gearing to actuate the valve at a prescribed actuation temperature by a wax element, the specifications of which can be adjusted to meet the system requirements. The linear gearing is driven by the actuation of the wax element itself. As the wax element expands or contracts and moves an actuating connection, it moves the linear gear component which, in turn, rotates the ball valve to open or close the circuits of the four-way valve.

In one aspect of at least one form thereof, a valve is provided with a valve body defining a plurality of connection features forming at least one inlet to and at least one outlet from the valve body, a valve seat in the valve body, a valve element operable with the valve seat to control fluid flow between and among the plurality of connection features, and a valve actuator having a temperature-responsive wax element and a linear gear moved by the wax element and connected to the valve element.

In another aspect of at least one form thereof a valve is provided with a valve body defining a plurality of connection features forming at least one inlet to and at least one outlet from the valve body, a valve seat in the valve body and a ball element operable with the valve seat to control fluid flow between and among the plurality of connection features. The ball element includes a gear. A linear gear is drivingly engaged with the gear of the ball element; and an actuator is connected to the linear gear for moving the linear gear to rotate the ball element In a further aspect of at least one form thereof, a four way valve is provided with a valve body defining a plurality of inlets to and outlets from the valve body, a valve seat in the valve body, and a rotatable ball element operable against the valve seat to control fluid flow between and among the inlets and the outlets. The ball element includes a gear. A linear gear is drivingly engaged with the gear of the ball element, and a temperature-responsive wax element is operably connected to the linear gear for movement of the linear gear.

Other features and advantages of the invention will become apparent to those skilled in the art upon review of the following detailed description, claims and drawings in which like numerals are used to designate like features.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 1:
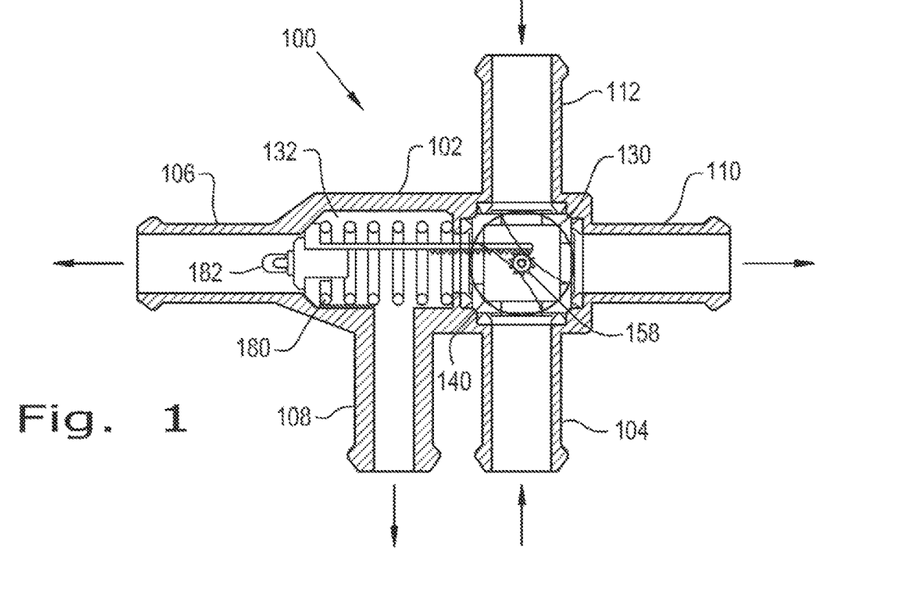
FIG. 1 is a cross-sectional view of a four-way valve for an engine cooling system, the valve being actuated by a wax element and linear gear arrangement, with the thermostat shown in a closed position.
Figure 2:
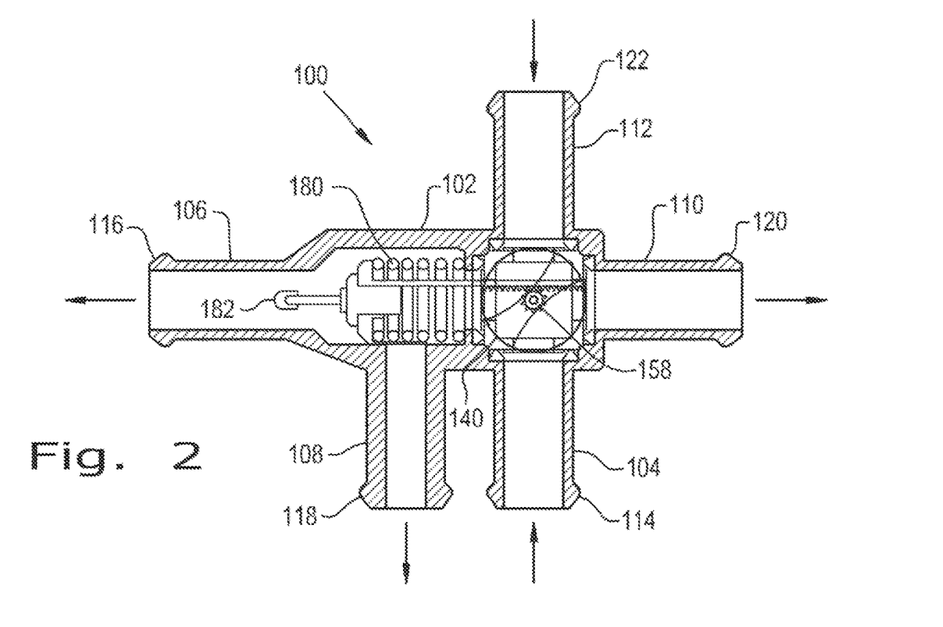
FIG. 2 is a cross-sectional view of the four-way valve shown in FIG. 1, but illustrating the thermostat in an opened position.
Figure 3:
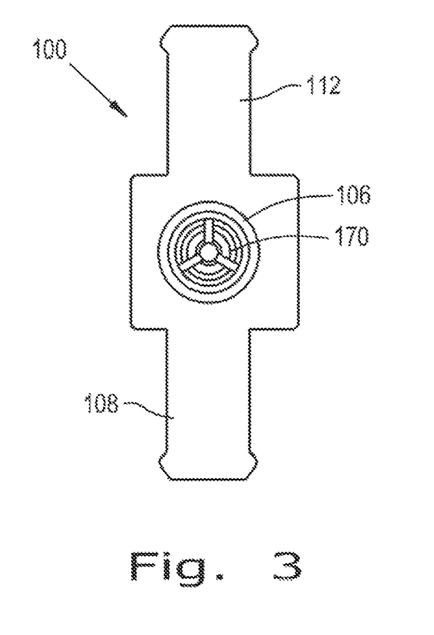
FIG. 3 is an end elevational view of the four-way, depicting the end on the left of FIGS. 1 & 2.
Figure 4:
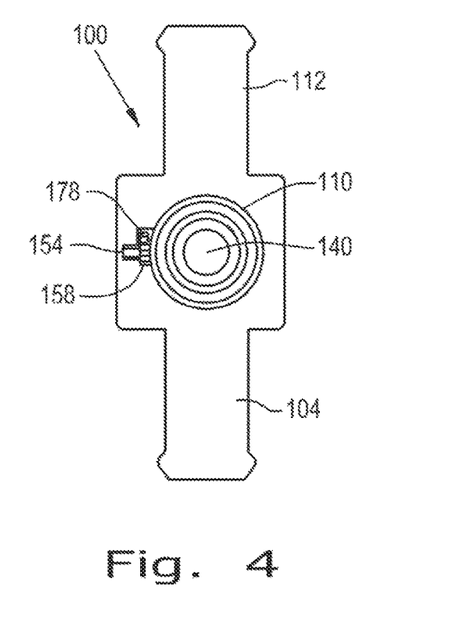
FIG. 4 is an end elevational view showing the end opposite the end shown in FIG. 3.
Figure 5:
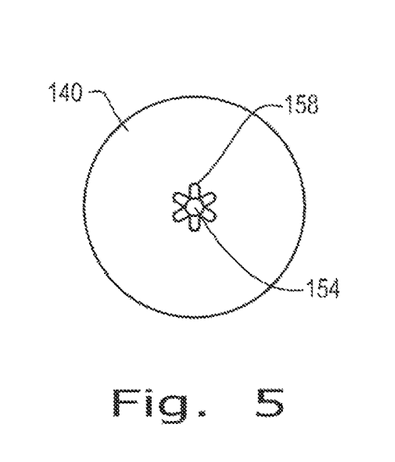
FIG. 5 is an elevational view of a ball element of the four-way valve.

Referring now more specifically to the drawings and to FIGS. 1 & 2 in particular, a four-way valve 100 is shown. Four-way valve 100 includes a valve body 102 which forms a plurality of fluid line connection features to which fluid conduits in a fluid circuit can be connected, such as, for example various coolant lines in a vehicle cooling system circuit. Accordingly, in the exemplary embodiment for a vehicle coolant circuit, valve body 102 has a first fluid line connection feature 104 forming an inlet to valve body 102 for connection to a fluid conduit to receive fluid flow from a motor, a second fluid line connection feature 106 forming an outlet from valve body 102 for connection to a fluid conduit to direct fluid flow to a radiator, a third fluid line connection feature 108 forming an outlet from valve body 102 for connection to a fluid conduit to direct fluid flow to a bypass circuit, a fourth fluid line connection feature 110 forming an outlet from valve body 102 for connection to a fluid conduit to direct fluid flow to a heater core, and a fifth fluid line connection feature 112 forming an inlet to valve body 102 for connection to a fluid conduit to receive fluid flow from the heater core. Fluid line connection features 104, 106, 108, 110 and 112 can be of various shapes, sizes and configurations. In the exemplary embodiment shown, each fluid line connection feature 104, 106, 108, 110, 112 is a relatively smooth sided cylindrical extension from valve body 102 suitable for receiving a hose-type fluid conduit in fluid flow connection. Each may further include an encircling shoulder 114, 116, 118, 120, 122; respectively, near the distal ends thereof for operating with a hose clamp (not shown) to form a secure, fluid-tight connection of a hose-type conduit on the connection feature. It should be understood that other configurations can be used for the fluid line connection features to establish secure, fluid-tight connections to chosen types of fluid conduits.

Internally, valve body 102 defines a valve seat 130 and a valve actuator channel 132. Valve seat 130 receives and operates with a valve element 140, to control and direct the flow of fluid through valve 100 between and among the various inlets to and outlets from valve 100 defined by fluid line connection features 104, 106, 108, 110, 112. In the exemplary embodiment shown, valve element 140 is a ball element. Valve actuator channel 132 contains a valve actuator 170 to be described subsequently herein.

Figure 6:
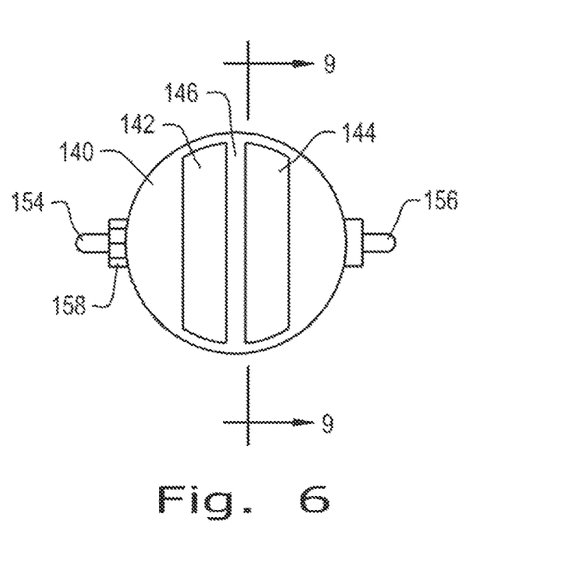
FIG. 6 is an elevational view of the ball element shown in FIG. 5, but rotated ninety-degrees from the position shown in FIG. 5.
Figure 7:
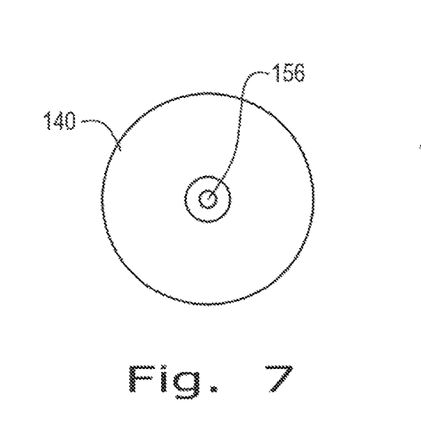
FIG. 7 is an elevational view of the ball element shown in FIGS. 5 & 6, but rotated an additional ninety-degrees from the position shown in FIG. 6, to illustrate a hemisphere of the ball element opposite to that shown in FIG. 5.
Figure 8:
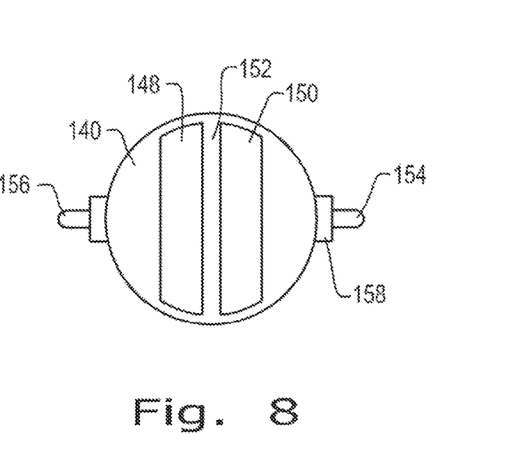
FIG. 8 is an elevational view of the ball element shown in FIGS. 5-7, but rotated still another ninety-degrees from the position shown in FIG. 7 to illustrate a hemisphere of the ball element opposite to that shown in FIG. 6.
Figure 9:
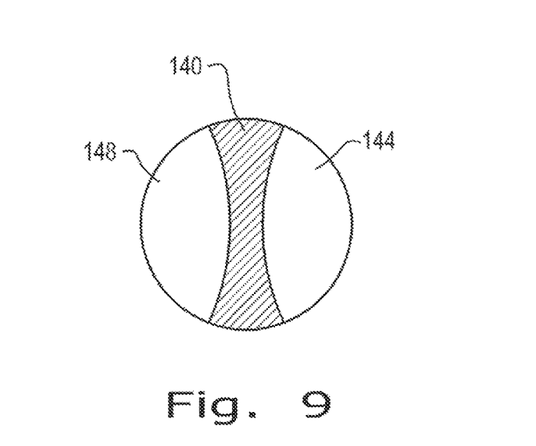
FIG. 9 is a cross-sectional view of the ball element, the cross-section taken along line 9-9 of FIG. 6.
Figure 10:
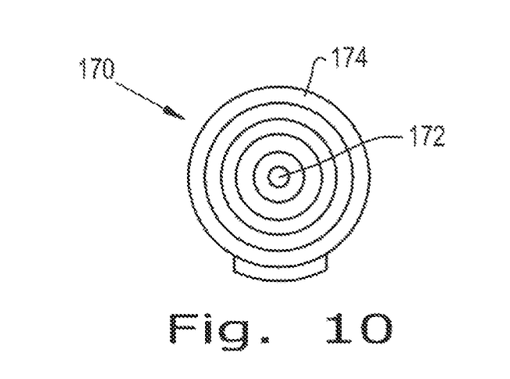
FIG. 10 is an end elevational view of actuator components of the four-way valve.
Figure 11:
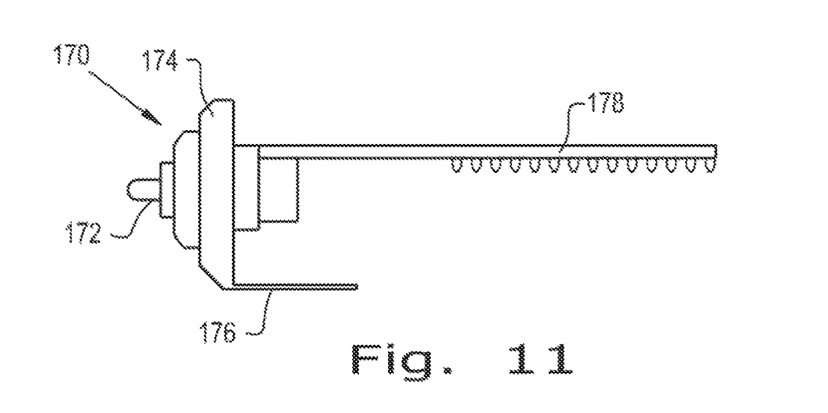
FIG. 11 is a side elevational view of the actuator components shown in FIG. 10.
Figure 12:
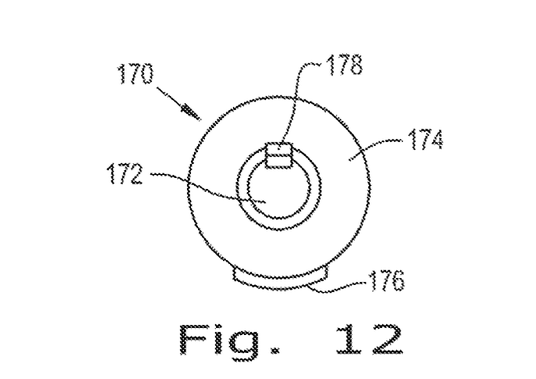
FIG. 12 is an end elevational view of the four-way valve actuator components shown in FIGS. 10 & 11, but illustrating the end opposite the end shown in FIG. 10.

In the exemplary embodiment, closure element 140 is ball element 140 that is rotatable against valve seat 130. Ball element 140 is generally spherical in shape, but has flow channels established into the surface thereof, so that when placed in an otherwise tight engagement with valve seat 130, flow paths are defined along the surface of ball element 140. In the exemplary embodiment shown most clearly in FIGS. 5-9, ball element 140 includes four flow channels arranged in pairs on generally opposite sides of ball element 140. Accordingly, spaced, parallel flow channels 142 and 144 are provided on opposite sides of a thin barrier 146 in a first hemisphere of ball element 140 shown in FIG. 6, and parallel flow channels 148 and 150 are provided on opposite sides of a thin barrier 152 in a second hemisphere of ball element 140 shown in FIG. 8. Ball element 140 is rotatable about an axis defined by pins 154, 156 projecting from a diameter of ball element 140 generally transverse to a plane through ball element 140 at the great circle on ball element 140 formed by and along barriers 146, 152. Pin 154 includes a gear 158 thereon. Pins 154, 156 can be separate and distinct from one another, or can be opposite ends of a single pin. Still further, pins 154, 156 and gear 158 can be features of a monolithic body including ball element 140. Through the orientation of flow channels 142, 144, 148, 150 via rotation of ball element 140 about the axis defined by pins 154 and 154 alternative connections can be made between and among the inlets and outlets defined by fluid line connection features 104, 106, 108, 110, 112.

Valve actuator 170 is provided for causing the rotation of ball element 140 in response to temperature changes. Valve actuator 170 includes a temperature responsive wax element 172 operatively connected to a shroud 174 for moving the shroud within actuator channel 132. Shroud 174 has a bypass shut-off member 176 and an axially extending linear gear 178. Linear gear 178 is drivingly connected to gear 158 on ball element 140. A return spring 180 biases the position of shroud 174 within valve body 102, spring 180 operating generally in opposition to wax element 172. Wax element 172 is anchored at an anchor point 182 for movement toward and away from return spring 180 in response to temperature changes. Bypass shut-off member 176 has a stowed position and an operative position for opening and closing third fluid line connection feature 108 to fluid flow there through.

Temperature responsive wax element 172 changes dimensionally in response to temperature changes in the environment surrounding it. Such changes result in axial movement of shroud 174, including axially extending linear gear 178 thereof. Axial movement of linear gear 178 causes rotation of gear 158 with which linear gear 178 is drivingly engaged. Through the interconnection of gear 158 with pin 154, and pin 154 with ball element 140, ball element 140 is caused to be rotated between various operating positions to open and close flow paths within valve body 102 defined between the various inlets and outlets formed by fluid line connection features 104, 106, 108, 110, 112.

Generally, for an automobile application, during a cold start up, two circuits are opened. The heater core flows around itself and coolant flow from the motor flows through bypass. This condition is depicted in FIG. 1, wherein valve 100 is in a so-called "closed" position. Spring 180 is expanded, bypass shut off member 176 is in a stowed position and flow through a bypass formed via third fluid line connection feature 108 is enabled. Flow channels 142, 144, 148 and 150 of ball element 140 are positioned so as to establish two separate fluid circuits. Fluid flow from the motor is received in valve 100 via a connection formed at first connection feature 104 and is directed through the valve to the outlet to bypass defined by third fluid line connection feature 108. Fluid from the heater core is received in valve 100 via the inlet formed at fifth connection feature 112 and is directed through valve 100 to the outlet defined by fourth connection feature 110 for flow back to the heater core.

When conditions are such that wax element 172 expands, valve 100 is adjusted to a so-called "opened" position as shown in FIG. 2. As wax element 172 is heated and expands, the wax element pushes against spring 180 to compress the spring. The wax element thereby moves shroud 174 and so as to position bypass shut off member 176 over the bypass port outlet defined by third fluid line connection feature 108. Linear gear 178, which is an extension of shroud 174 and moves together with shroud 174, is engaged with gear 158 on ball element 140 to move the ball element. Flow channels 142, 144, 148 and 150 of ball element 140 are positioned so as to establish a different flow pattern between and among the inlets and outlets defined by fluid line connection features 104, 106, 108, 119 122. With valve 100 open, fluid flow from the motor is received in valve 100 via the connection formed at first connection feature 104 and is directed through the valve to the outlet defined by fourth connection feature 110 for flow to the heater core. Fluid from the heater core is received in valve 100 via the inlet formed at fifth connection feature 112 and is directed through valve 100 to the outlet defined by second connection feature 106 for continued flow to a radiator.

Figure 13:
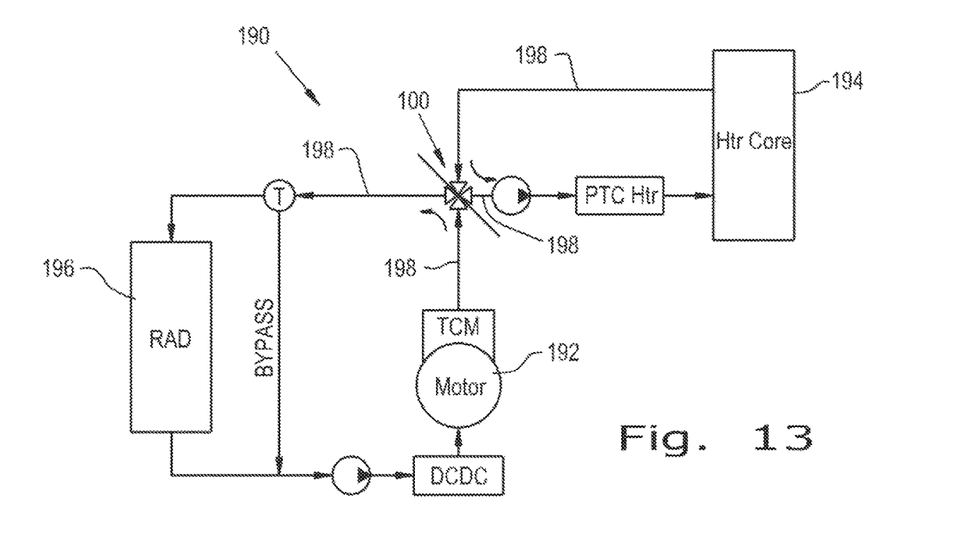
FIG. 13 is a schematic illustration of an engine coolant circuit using the four-way valve shown in the previous drawings, illustrating the valve to be closed.
Figure 14:
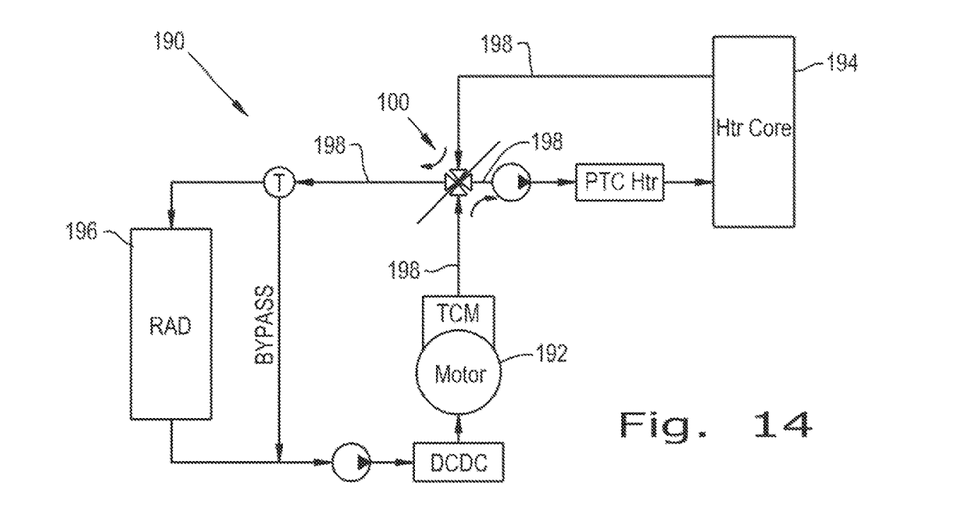
FIG. 14 is a schematic illustration similar to FIG. 13, but illustrating the coolant circuit with the four-way valve opened.

An exemplary circuit flow arrangement and the two positions of the thermostatic valve described above are shown in FIGS. 13 and 14, wherein four-way valve 100 is connected in a coolant circuit 190 established between a motor 192, a heater core 194 and a radiator 196 interconnected by various coolant conduits 198. FIG. 13 depicts the circuit condition when valve 100 is closed, and FIG. 14 depicts the circuit condition when valve 100 is opened.

The thermostatic 4-way valve disclosed herein can use Polyphenylene Sulfide and Nylon 6/6 or Polypthalamide based components for the main body 102 and ball element 140. A sealing area defined adjacent and against ball element 140 can utilize PTFE and EPDM rubber to create the seating area and the supporting spring forces needed for proper sealing. The driving element can be a wax element of material typical of thermostatic component valves.

This four-way valve can be produced to operate at various opening temperatures depending on the system requirements. This can be accomplished by using different wax elements which can have different actuation characteristics at prescribed set points of the wax mixtures. Given this ability to change the opening temperature by using different wax mixtures, the part can be used by various users under different conditions and for different purposes. The wax element can be designed to open at the specification requirements for each. The valve also can be used in heated or cooled liquid applications. Depending on the plastic materials used, the valve can allow flexibility in what liquids the valve can handle. Generally, the ball element, the valve body, the valve seat and spring materials can also be changed to handle specific fluids, if required.

Other variations and modifications can be made. For example, there can be included additional shrouding structures around the wax element to close off other ports, if required. A second return spring could be added to further improve the return function of the actuation.

This design allows for reduction in valve envelope size compared to the other systems which require large vacuum actuators or multiple springs which require large spring pockets in the valve body. This design also requires fewer components, as the gearing can be incorporated into existing components of the valve. This enables the valve to allow for two separate circuits then switch to one complete circuit at a prescribed opening temperature.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A valve for use in a vehicle cooling system, said valve comprising:
   a valve body including a fluid flow path within said valve body, wherein said valve body is configured for connection to fluid conduits in the vehicle cooling system, said valve body including a valve actuator channel within said fluid flow path, said valve body defining a plurality of connection features forming at least one inlet and at least one outlet from said valve body, wherein said fluid flow path includes said at least one inlet fluidly connected to said at least one outlet;
   a valve seat in said valve body;
   a valve element operable with said valve seat to control fluid flow between and among said plurality of connection features, wherein said valve element includes a valve gear; and
   a valve actuator including:
      a temperature-responsive wax element operatively connected to a shroud that is disposed within and configured to move within said valve actuator channel, wherein said temperature-responsive wax element is responsive to temperature changes of an environment surrounding said temperature-responsive wax element; and
      a linear gear extending from said shroud, wherein said linear gear is configured to be moved by said wax element and is connected to said valve element, wherein said linear gear is drivingly connected to said valve gear.

2. The valve of claim 1, wherein said valve element is a ball element having flow channels in a surface thereof.

3. The valve of claim 1, said shroud having a shutoff member for selectively closing flow through at least one of said plurality of connection features.

4. The valve of claim 1, wherein said linear gear extends from said shroud to said valve element, and said temperature-responsive wax element is anchored in said valve actuator channel and is disposed against an end of said shroud.

5. The valve of claim 4, further including a spring operatively disposed against said shroud in opposition to said temperature-responsive wax element.

6. The valve of claim 5, said shroud having a shutoff member for selectively closing flow through at least one of said plurality of connection features.

7. A valve for use in a vehicle cooling system, said valve comprising:
   a valve body having a valve actuator channel within a fluid flow path within said valve body, said valve body defining a plurality of connection features forming at least one inlet and at least one outlet from said valve body, wherein said fluid flow path includes said at least one inlet fluidly connected to said at least one outlet;
   a valve seat in said valve body;
   a ball element operable with said valve seat to control fluid flow between and among said plurality of connection features, said ball element including a gear directly fixed thereto;

a shroud disposed within and configured to move within said valve actuator channel;

a linear gear extending from said shroud and drivingly engaged with said gear of said ball element; and an actuator connected to said linear gear for moving said linear gear to rotate said ball element, wherein said actuator is a temperature-responsive wax element that is responsive to temperature changes of an environment surrounding said temperature-responsive wax element.

8. The valve of claim 7, wherein said temperature-responsive wax element is anchored in said channel.

9. The valve of claim 8, wherein said shroud includes a shutoff member for selectively opening and closing flow through at least one of said plurality of connection features upon movement of said shroud.

10. The valve of claim 9, including a spring in said actuator channel, said spring acting against said shroud in opposition to said wax element.

11. A four-way valve for use in a vehicle cooling system, said four-way valve comprising:

a valve body defining a valve actuator channel within a fluid flow path within said valve body, wherein said fluid flow path includes at least two inlets fluidly connected to at least two outlets;

a valve seat in said valve body;

a rotatable ball element operable against said valve seat to control fluid flow between and among said inlets and said outlets, said ball element including a gear;

a shroud disposed within and configured to move within said valve actuator channel;

a linear gear extending from said shroud and drivingly engaged with said gear of said ball element; and a temperature-responsive wax element operably connected to said linear gear for movement of said linear gear wherein said temperature-responsive wax element is responsive to temperature changes of an environment surrounding said temperature-responsive wax element.

12. The four-way valve of claim 11, wherein said shroud includes a shutoff member having positions to open and close flow through at least one of said at least two inlets and said at least two outlets.

13. The four-way valve of claim 12 including a spring disposed against said shroud in opposition to said temperature-responsive wax element.

14. The four-way valve of claim 12, said temperature-responsive wax element being anchored in said channel and operable against said shroud.

15. The four-way valve of claim 14, including a spring disposed against said shroud in opposition to said temperature-responsive wax element.

* * * * *